D. RUPPART.
Seed Planter.
No. 62,290.  Patented Feb. 19, 1867.
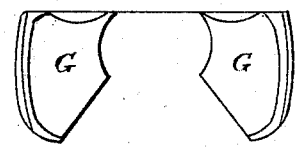
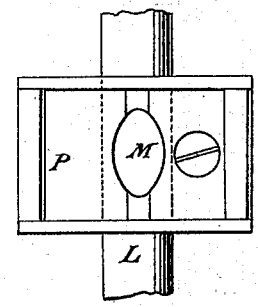
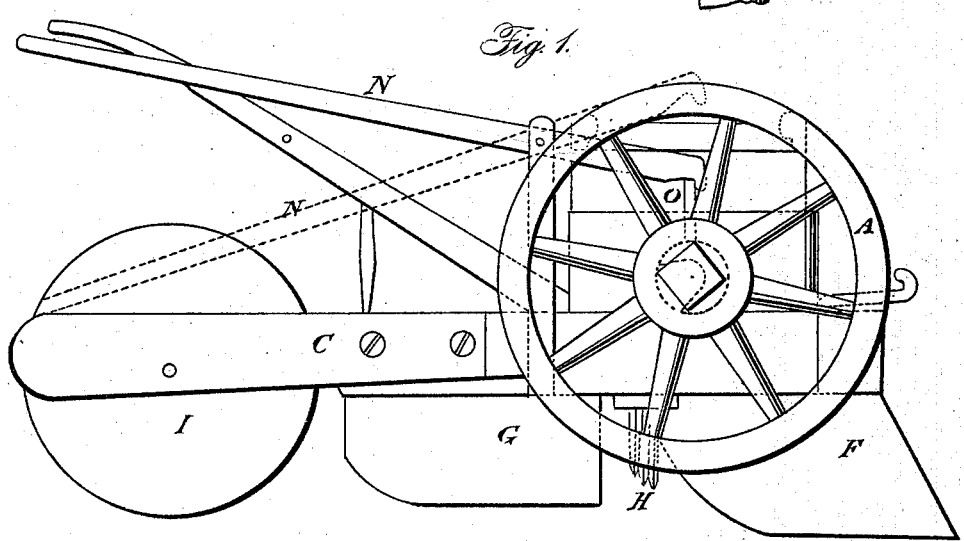
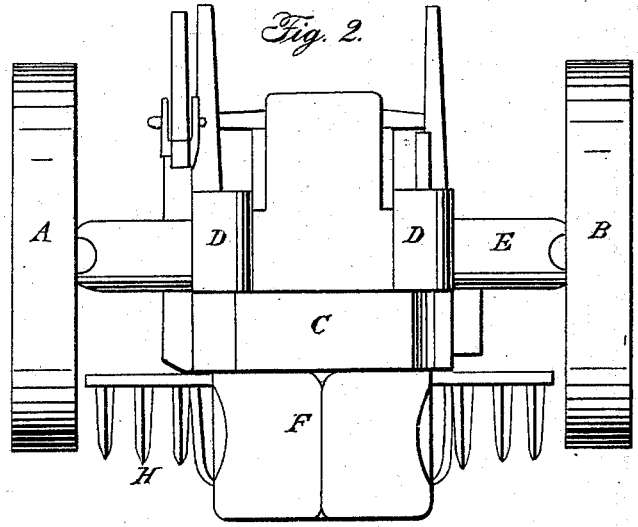
Inventor:
Daniel Ruppart
by Daniel Breed Attorney

United States Patent Office.

DANIEL RUPPART, OF NIMISILLA, OHIO.

Letters Patent No. 62,290, dated February 19, 1867.

IMPROVEMENT IN CORN PLANTERS.

*The Schedule referred to in these Letters Patent and making part of the same.*

TO ALL WHOM IT MAY CONCERN:

Be it known that I, DANIEL RUPPART, of Nimisilla, in the county of Summit, and State of Ohio, have invented a new and useful Improvement in Corn Planters; and I do hereby declare that the following is a full and exact description thereof, reference being had to the accompanying drawings, and to the letters of reference marked thereon.

My invention consists in a peculiar construction of corn planters designed for planting corn mixed with plaster and in cross-rows, a rake being employed on each side, near the rear of the opener, and a roller behind the coverers. In the accompanying drawings—

Figure 1 is a side view of my corn planter.
Figure 2 is a front view of the same.
Figure 3 is a detached top view of the seed-box, showing the feed-hole in the axle.
Figure 4 is a detached view of the forward end of the coverers.

My machine is provided with a pair of wheels in front, seen at A B, fig. 2. Upon the axle E, which revolves with the wheels, is arranged a frame, C, which is secured in place by the two bearing-pieces D. Under the front of the frame is a plough or opener, F, which turns a furrow both ways. Between this opener and the coverer G are placed two rakes H, in order to clear away weeds and other obstructions from the new furrows. Following the rakes comes a peculiar-shaped coverer, G, formed of two scrapers, set wide apart in front, and having lips curved inward at bottom, as seen in fig. 4. The roller I, upon the rear of the frame, finishes the work. The corn, being mixed with plaster, is put into the hopper or seed-box P, fig. 3; and, as the machine advances, and the axle L revolves, the feed-hole M (which is in the axle) will deposit regularly four or five kernels of corn in every hill. A lock-lever, N, with a hook in front, is employed to catch the stop-arm O, and thus prevent the revolution of the axle (and dropping seed) in turning the machine at the end of the rows. By unlocking this lever at the proper time, so as to plant the first hill in commencing a row directly opposite the last hill in the preceding row, the whole field may be planted in cross-rows, and then worked both ways.

Having thus fully described my invention, what I claim, and desire to secure by Letters Patent, is—

1. The above-described construction and arrangement of axle L, provided with feed-hole M, in combination with the lock-lever N and arm O, substantially as set forth.

2. I claim the rakes H, in combination with the coverers, substantially as described.

DANIEL RUPPART.

Witnesses:
    DAVID STUMP,
    SAMUEL HOSE.